United States Patent
Turner

[11] Patent Number: 6,056,381
[45] Date of Patent: May 2, 2000

[54] VIBRATION ISOLATION PLATFORM

[76] Inventor: Gary John Turner, 1 Michael Fields, Forest Row, East Sussex RH18 5BH, United Kingdom

[21] Appl. No.: 08/545,604
[22] PCT Filed: May 6, 1994
[86] PCT No.: PCT/GB94/00982
§ 371 Date: Jun. 21, 1996
§ 102(e) Date: Jun. 21, 1996
[87] PCT Pub. No.: WO94/26145
PCT Pub. Date: Nov. 24, 1994

[30]  Foreign Application Priority Data

May 7, 1993 [GB] United Kingdom .................. 9309409

[51] Int. Cl.[7] .................................................. A47B 96/00
[52] U.S. Cl. .................. 312/351; 312/223.1; 312/223.2; 312/352; 248/634; 248/235; 108/161
[58] Field of Search ........................ 312/7.2, 351, 223.1, 312/352, 351.1; 248/634, 632, 235; 108/193, 180, 149, 157.1, 161, 157.13; 211/26; 52/480, 262, 263, 236.6, 236.7, 236.9, 403.1

[56]  References Cited

U.S. PATENT DOCUMENTS

| 1,253,473 | 1/1918 | Davis ................................... 108/161 X |
| 1,418,701 | 6/1922 | Corcoran ................................. 248/635 |
| 1,806,014 | 5/1931 | Flintermann ........................ 248/634 X |
| 2,260,029 | 10/1941 | Hull ........................................ 248/632 |
| 3,499,255 | 3/1970 | Sweeney et al. ......................... 52/263 |
| 4,278,726 | 7/1981 | Wieme ................................. 248/560 X |
| 4,294,177 | 10/1981 | Nicholson ........................ 312/257.1 X |
| 4,449,342 | 5/1984 | Abendroth ............................. 52/480 X |
| 4,909,473 | 3/1990 | Korinek et al. ........................... 248/634 |
| 5,197,707 | 3/1993 | Kohan . |
| 5,253,464 | 10/1993 | Nilsen .................................. 52/480 X |
| 5,300,355 | 4/1994 | Mifune et al. ...................... 248/634 X |

FOREIGN PATENT DOCUMENTS

| 520385 | 12/1992 | European Pat. Off. . |
| 4036538 | 5/1992 | Germany . |
| 681270 | 2/1993 | Switzerland ........................... 248/635 |
| 377329 | 7/1932 | United Kingdom .................. 248/632 |
| 537823 | 7/1941 | United Kingdom .................. 248/634 |
| 875513 | 8/1961 | United Kingdom . |
| 2089465 | 6/1982 | United Kingdom .................. 248/634 |

OTHER PUBLICATIONS

Product Engineering; vol. 33, No. 22; Oct. 1962; p. 26; J. Roberts "At NASA, they're adapting Space R&D for industry".
Patent Abstracts of Japan; vol. 16, No. 487 (M–1323); Oct. 1992 & JP,A,04,179,767 (Tomoko Yamano); Jun. 1992.
Patent Abstracts of Japan; vol. 16, No. 359 (M–1289); Aug. 1992 & JP,A,04 111 857 (Tatsuta Electric Wire & Cable Co Ltd) Apr. 1992.

Primary Examiner—Janet M. Wilkens
Attorney, Agent, or Firm—Millen, White, Zelano & Branigan

[57]  ABSTRACT

A vibration isolation platform comprises a shelf member (15) supported by two beam members (25). An acoustic isolation member (20) is located between the shelf member and each beam member. Support members (11) engage and support each beam member (25) at two points (28) in such a manner as to allow flexing of the beam member.

26 Claims, 10 Drawing Sheets

VIBRATION ISOLATION PLATFORM

FIELD OF THE INVENTION

The present invention relates to a vibration isolation platform for use with hi-fi audio and other vibration sensitive equipment.

BACKGROUND OF THE INVENTION

It is recognised by many experts in the field of hi-fi equipment that for optimum performance, certain components of the equipment need to be isolated from vibration. This is certainly true for record decks, and it is also considered by many experts to be essential for other hi-fi components such as compact disc players and amplifiers and, in particular, valve amplifiers.

In an attempt to avoid interference from external vibrations, many owners of very high quality hi-fi equipment mount the vibration sensitive components of the equipment on a massive platform that is spiked directly to the floor. The platform provides a very rigid and stable surface for the equipment. Such platforms are, however, expensive as well as being very heavy, and they do not entirely isolate the equipment from vibrations transmitted through the floor.

Also available is a gas-damped vibration isolation platform, which is sold under the trade mark SEISMIC SINK. That device provides very effective isolation from vibrations, but it is too expensive for its use to be justified except with the most expensive hi-fi equipment.

SUMMARY OF THE INVENTION

According to the present invention there is provided a vibration isolation platform comprising a shelf member supported by two beam members, an acoustic isolation member located between the shelf member and each beam member and two support members engaging and supporting each beam member in such a manner as to allow flexing of the beam member.

The shelf member and the beam members are designed to have very different resonant frequencies, so that vibrations which cause resonance in one of those components do not cause vibrations of large amplitude in other component. The acoustic isolation members that are located between the shelf member and each of the beam members absorb and dissipate most of the transmitted vibrational energy. The platform thereby provides very effective isolation from low magnitude vibrations.

The beam members may be provided adjacent opposed edges of the shelf member.

Recesses may be provided in the shelf member to accommodate the beam members and the acoustic isolation members. The recesses may be formed in the edges of the shelf or, alternatively, in the underside of the shelf.

The beam members may be of laminated construction.

The beam members may be made from aluminium, brass, stainless steel, M.D.F. (medium density fiberboard) or other materials, or a combination of those materials.

The beam members may include an acoustic isolation material.

The shelf may be made from M.D.F., float glass, laminated glass, CORIAN or other materials.

The shelf may have a mass of at least 2 kg.

The acoustic isolation members may be made from a material having a specific damping value of at least 50%, and preferably 55%, as measured by dropping a 12 lb. sphere from a height of 6.5 feet, and as calculated using the equation:

$$\text{specific damping} = \frac{\text{energy lost}}{\text{max. possible energy loss}} \times \frac{4}{\pi} \times 100\%$$

The acoustic isolation members may have a thickness of at least 10 mm, and preferably 12 mm.

Acoustic isolation materials may be provided between the beam members and the support members.

The support members may comprise feet provided on the underside of the beam members. The feet may include acoustic isolation materials.

The beam members and the acoustic isolation members may be housed in a sub-assembly on which the shelf stands.

The present invention further provides a cabinet for hi-fi equipment, the cabinet including a vibration isolation platform as described above. In the cabinet, the support members may comprise shelf supports.

The present invention yet further provides an article of vibration sensitive equipment including a vibration isolation platform as described above.

BRIEF DESCRIPTION OF THE DRAWINGS

Embodiments of the invention will now be described, by way of example, with reference to the accompanying drawings, of which.

DESCRIPTION OF PREFERRED EMBODIMENTS

Figure 1:
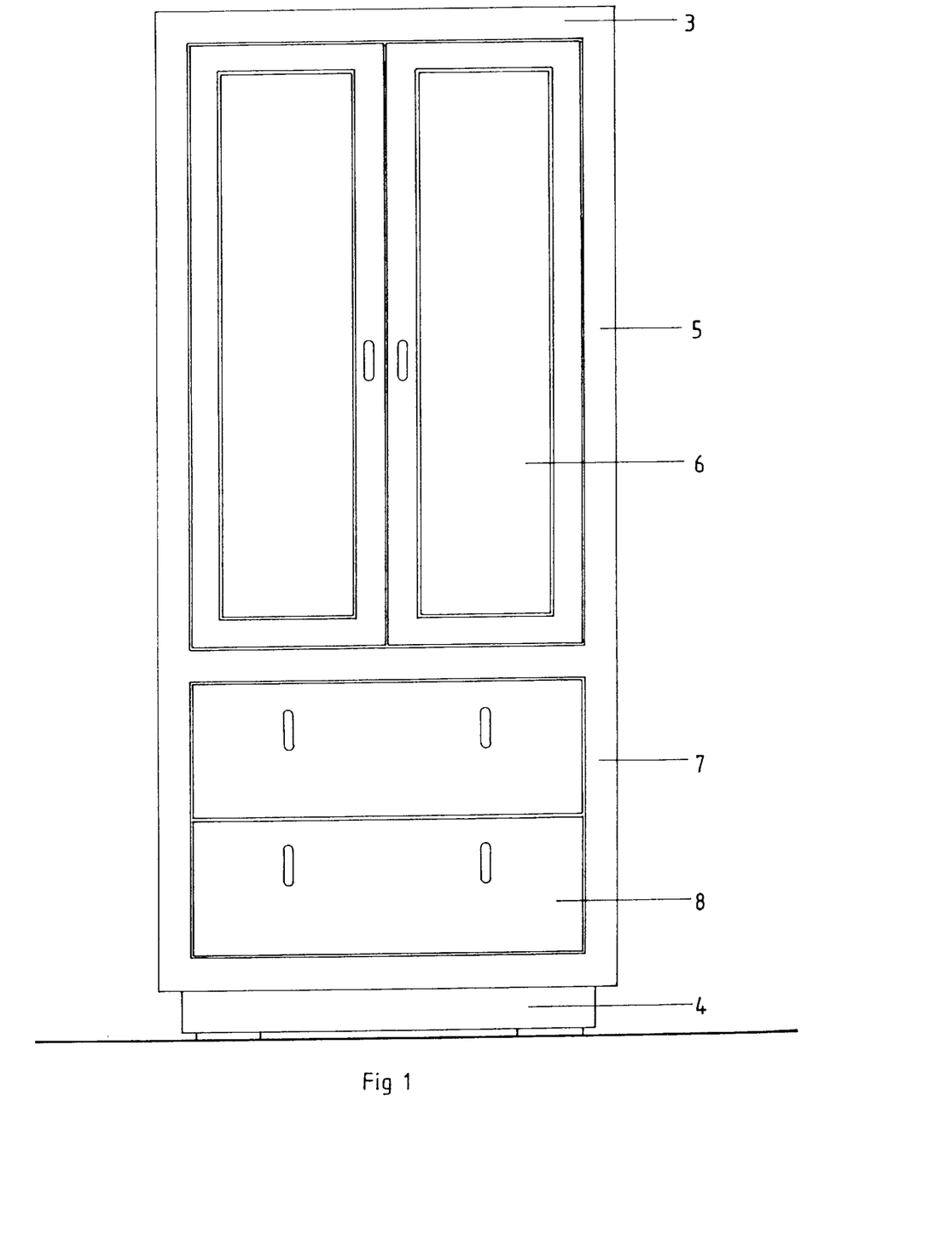
FIGS. 1 and 2 are front and a cross-sectional side views of a cabinet for hi-fi equipment.
Figure 2:
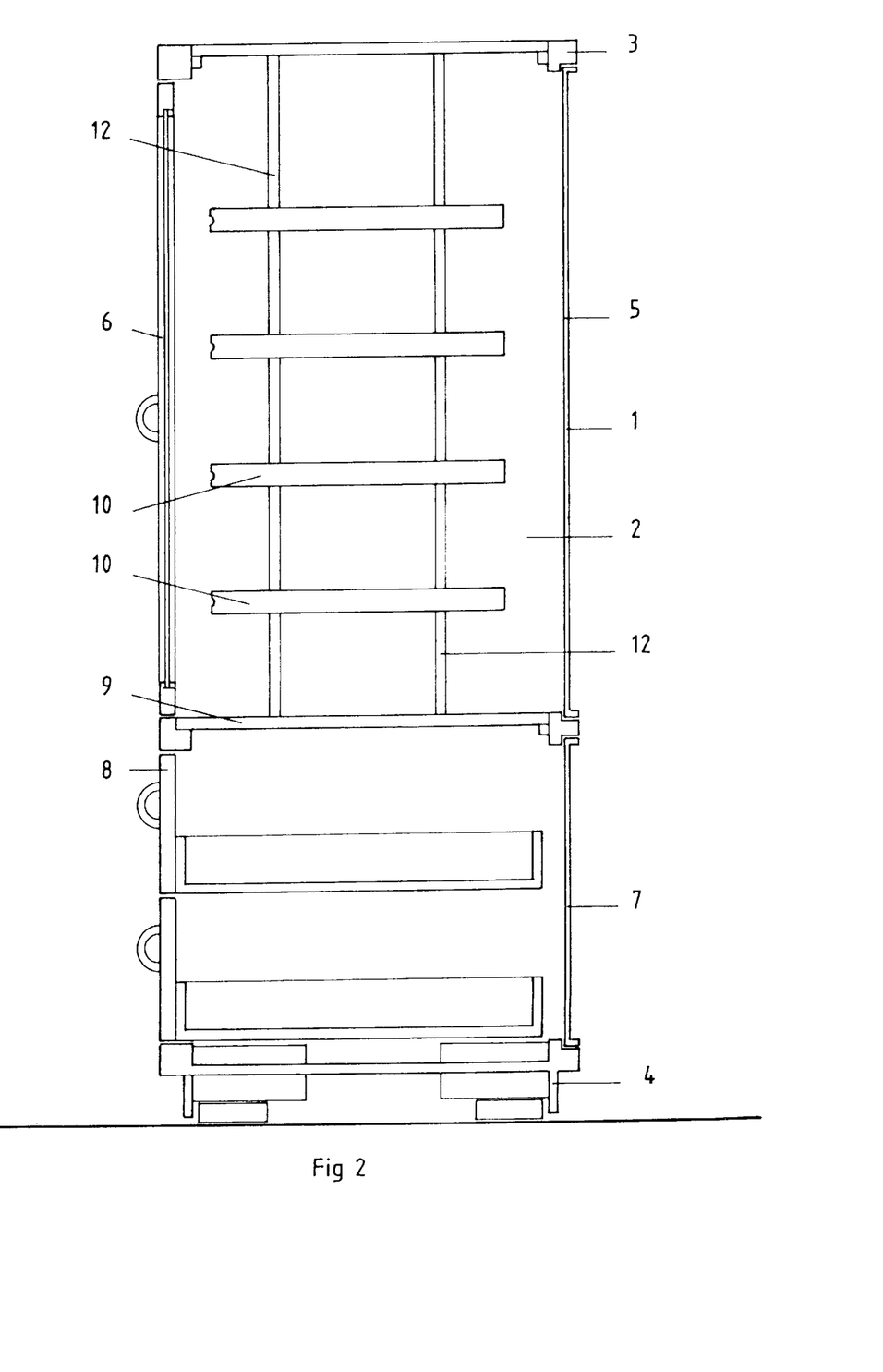

FIGS. 1 and 2 show a cabinet for hi-fi equipment and recorded media. The cabinet comprises a rear panel 1, two side panels 2, a top 3 and a base 4. The upper part 5 of the cabinet, which houses the hi-fi equipment, is closed at the front by two hinged doors 6. In the lower part 7 of the cabinet there are provided two drawers 8 for storing tapes, compact discs and other recorded media.

The upper part 5 of the cabinet, which is divided from the lower part 7 by an internal shelf 9, contains four vibration isolation platforms 10 for receiving the hi-fi equipment. The platforms 10 are supported by shelf supports 11, which are hooked into apertures in two racks 12 provided on the inner surface of each of the side panels 2. The shelf supports 11 can be moved up or down the racks 12 to alter the positions of the platforms 10 within the cabinet.

Figures 3, 4, 7, 8:
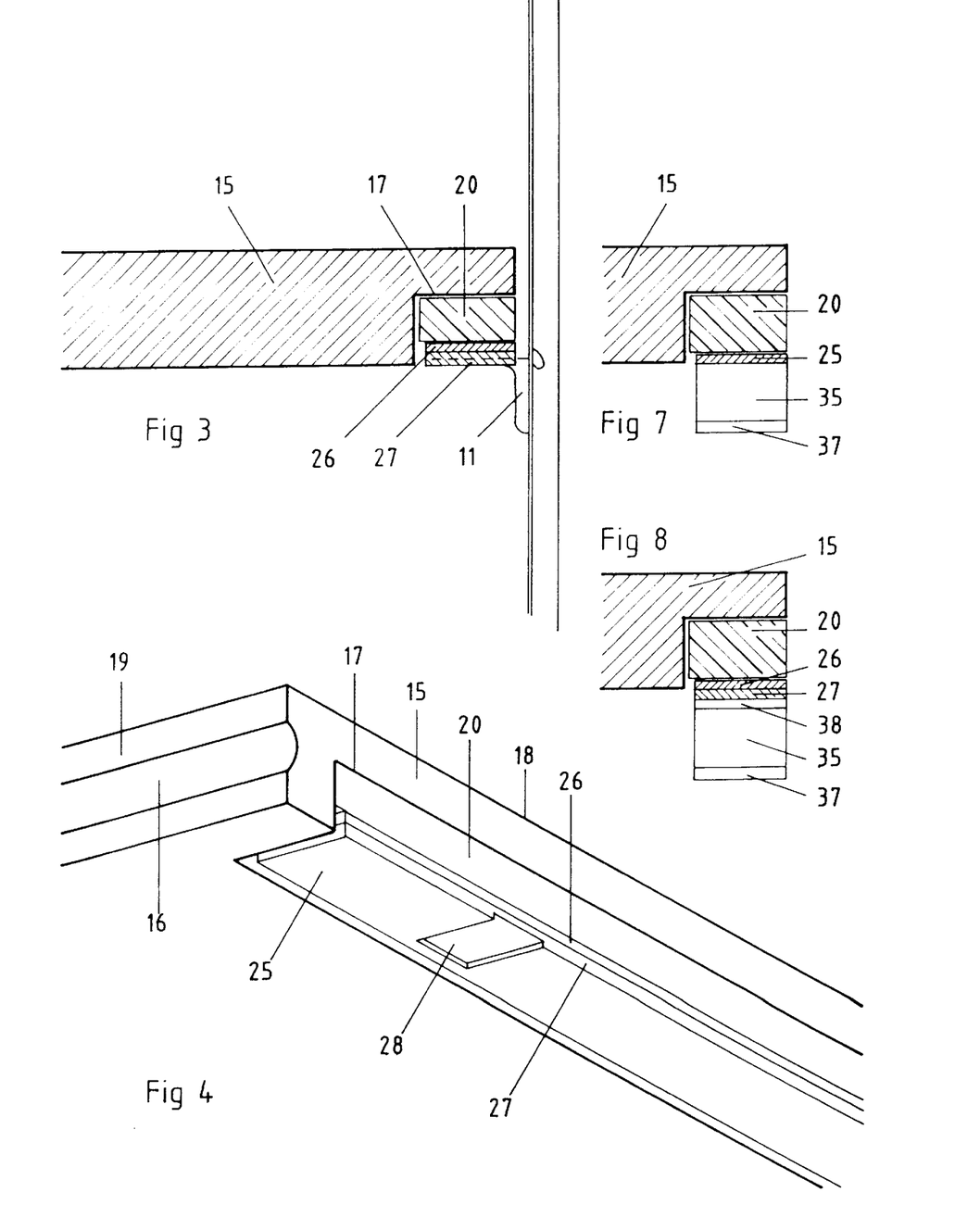
FIGS. 3 and 4 are partial cross-sectional front and perspective views of a first acoustic isolation platform.
FIGS. 7 and 8 are partial cross-sectional front views of third and fourth acoustic isolation platforms.

The construction of one of the vibration isolation platforms 10 is shown in more detail in FIGS. 3 and 4. The platform 10 includes a shelf 15, which is manufactured from medium density fibreboard (M.D.F.) and has dimensions of approximately 515×360×18 mm and a mass of approximately 2.5 kg. A decorative groove 16 is formed in the front edge of the shelf. The shelf 15 has a laminated, sprayed or veneer decorative finish.

Rectangular rebates 17 are formed in the underside of the shelf 15 along each of its shorter edges 18. The rebates 17 extend rearwards from a point a few centimeters behind the front edge 19 of the shelf 15 so that they cannot be seen from in front of the shelf.

Located within each rebate 17 and extending along its length is a strip acoustic isolation material 20. The material might, for example, be the visco-elastic polyurethane material sold under the trade mark SORBOTHANE. The strip 20, which has a thickness of approximately 12 mm, is bonded to the top of a laminated beam 25 comprising a 3.2 mm layer of aluminium 26 on top of a 3.0 mm layer of M.D.F. 27. Two shallow rectangular notches 28 are cut in the bottom surface of the M.D.F. layer 27 to form engagement surfaces for the shelf supports 11.

The platform 10 is designed to prevent vibrations being transmitted from the cabinet to the shelf, and vice versa. The main features of the design are as follows. The beams 25 are slightly flexible and are supported by the shelf supports 11 in such a way as to allow them to flex when vibrations are transmitted to them from the supports 11. However, because the beams 25 and the shelf 15 are separated from one another by the strips 20 of acoustic isolation material, very little of that vibrational energy is transmitted to the shelf. Further, the shelf 15 and the beams 25 are designed to have very different resonant frequencies, so that vibrations which cause resonance in the beams 25 will tend not to cause sympathetic vibrations in the shelf 15. Furthermore, the shelf 15 has a large mass and is made of an acoustically dead material (M.D.F.) to prevent ringing and reduce vibrations at resonance to a minimum. Acoustically dead materials may also be used in the beams 25. The combination of those features provides very effective acoustic isolation.

Figure 5:
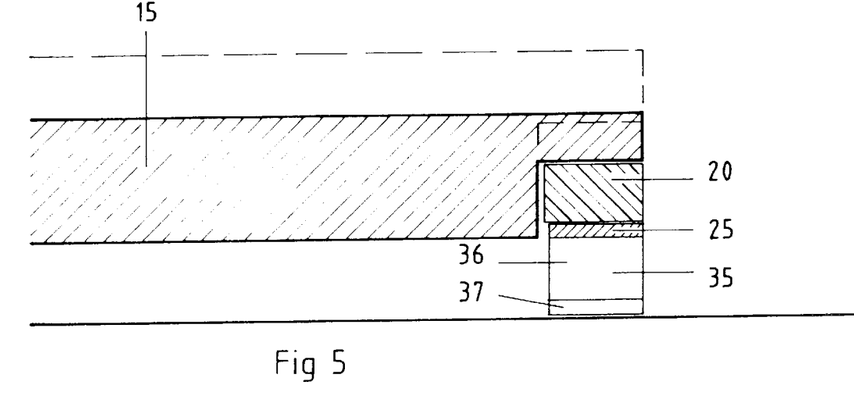
FIGS. 5 and 6 are partial cross-sectional front and perspective views of a second acoustic isolation platform.
Figure 6:
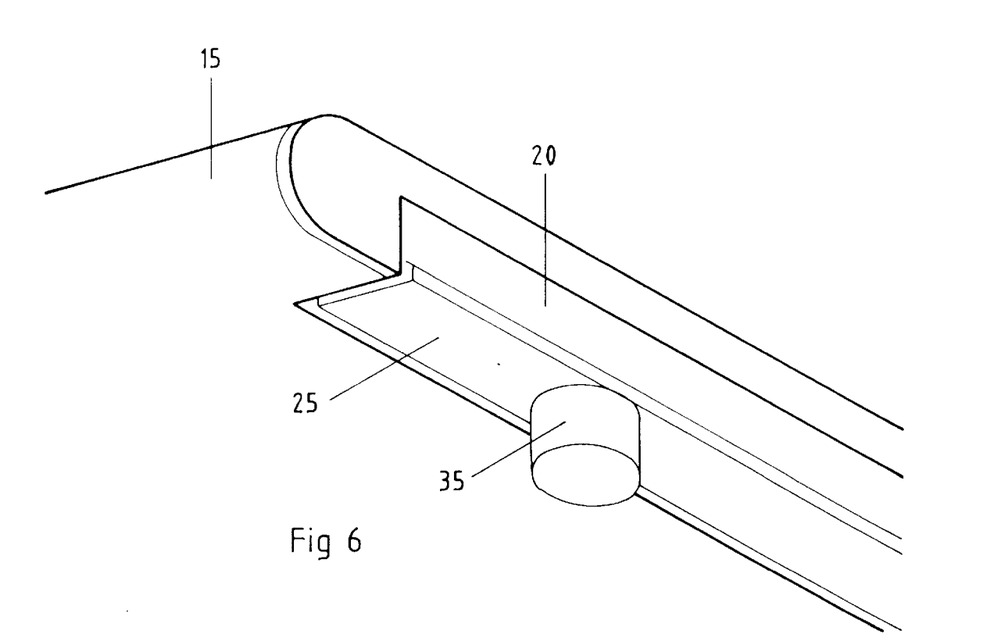

A free standing version of the platform is shown in FIGS. 5 and 6. In this version, the shelf 15 and the beam 25 are very similar to those shown in FIGS. 3 and 4. However, instead of being suspended from shelf supports, two feet 35 are provided on the underside of each beam 25. Each foot 35 comprises a short upright cylinder 36 of aluminium on top of a disc 37 of acoustic isolation material.

Also shown in dotted lines in FIG. 5 is a variant in which the thickness of the shelf is increased to 38 mm and the height of the rebate 17 is increased to accommodate a thicker strip 20 of acoustic isolation material.

Two further free standing versions of the platform shown in FIGS. 3 and 4 are shown in FIGS. 7 and 8. In FIG. 7, a shelf 15 similar to that shown in FIG. 3 is supported at each edge 18 by a 12 mm thick strip 20 of acoustic isolation material on top of a 3.2 mm aluminium beam 25. Each beam 25 is supported by two aluminium feet 35 which stand on top of 16 mm pads 37 of acoustic isolation material.

The platform shown in FIG. 8 is similar to that shown in FIG. 7, except that the beam 25 is a composite of 3.2 mm aluminium 26 and 3.0 mm M.D.F. 27, and a pad 38 of acoustic isolation material is also provided on top of each foot 35.

Figure 9:
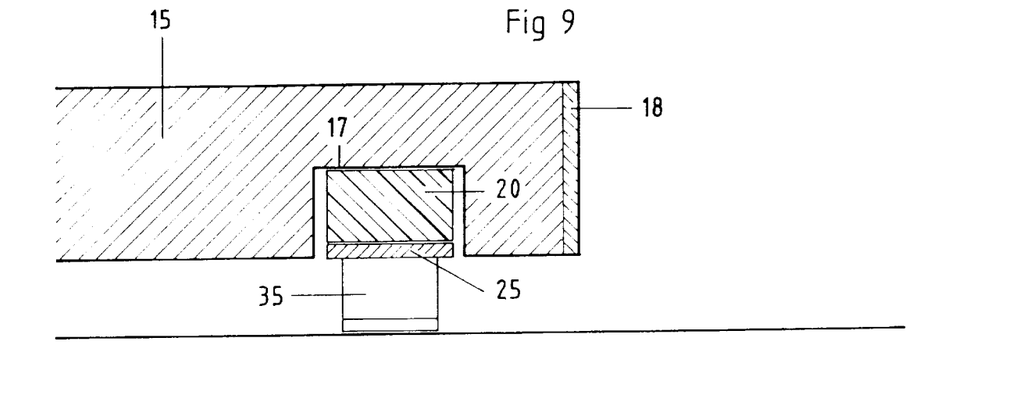
FIGS. 9 and 10 are partial cross-sectional front and perspective views of a fifth acoustic isolation platform.
Figure 10:
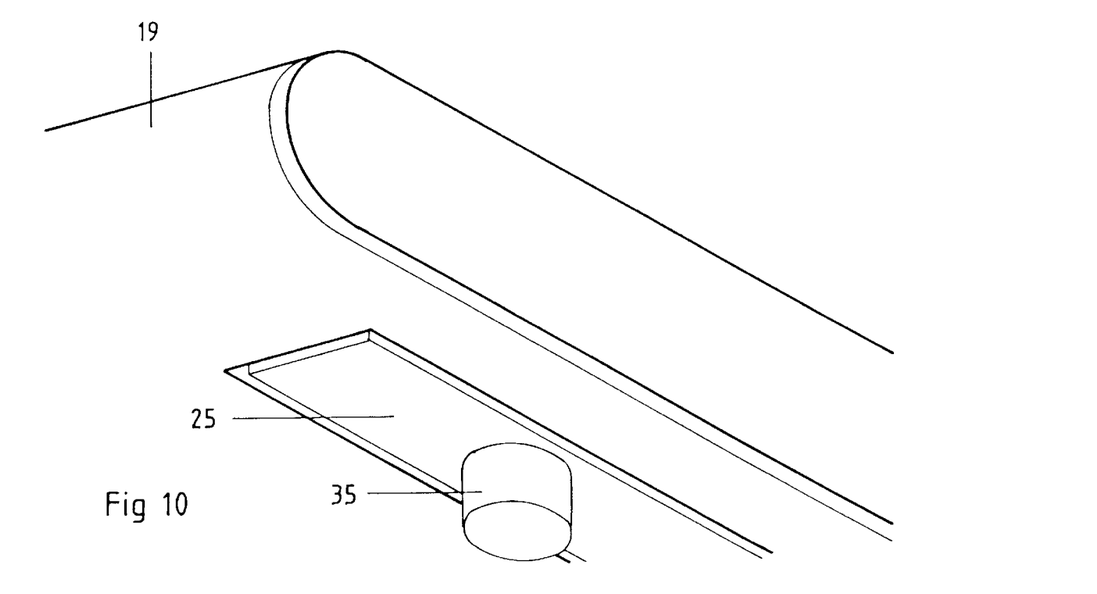

Another free standing version of the platform is shown in FIGS. 9 and 10. In this version, the rebates 17 are provided in the underside of the shelf 15, spaced inwardly by a few centimeters from the edge 19 of the shelf. A strip of acoustic isolation material 20 and a beam 25 are located within each of the rebates 17, each beam 25 being supported by two feet 35. A decorative finish is provided by a strip of wood or other material being bonded to the edges 18 of the shelf 15.

Figure 11:
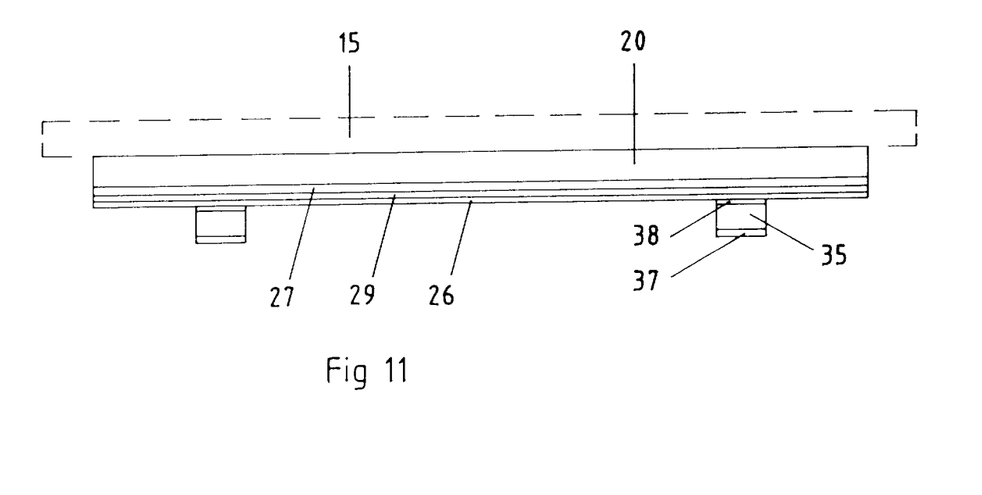
FIGS. 11 and 12 are side and partial cross-sectional front views of a sixth acoustic isolation platform.
Figure 12:
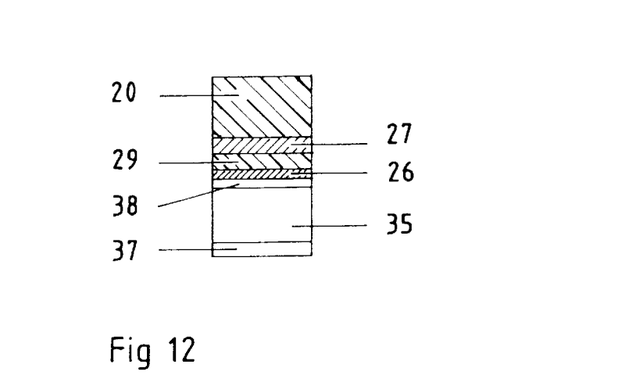

A further free-standing version of the platform is shown in FIGS. 11 and 12. In this version, the shelf 15 is not provided with rebates and the acoustic isolation material 20 simply engages the underside of the shelf 15. The beam 25, in this version, has a composite structure, comprising a 3 mm layer of M.D.F. 27, a 2 mm strip of acoustic isolation material 29 and a 1.6 mm thick aluminium layer 26. The feet 35 include pads 37, 38 of acoustic isolation material at both ends.

Figure 13:
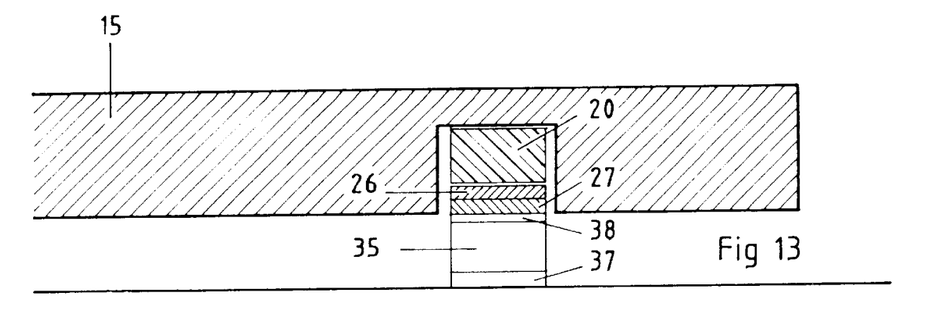
FIGS. 13, 14, 15 and 16 are partial cross-sectional front views of seventh, eighth, ninth, and tenth acoustic isolation platforms.
Figure 14:
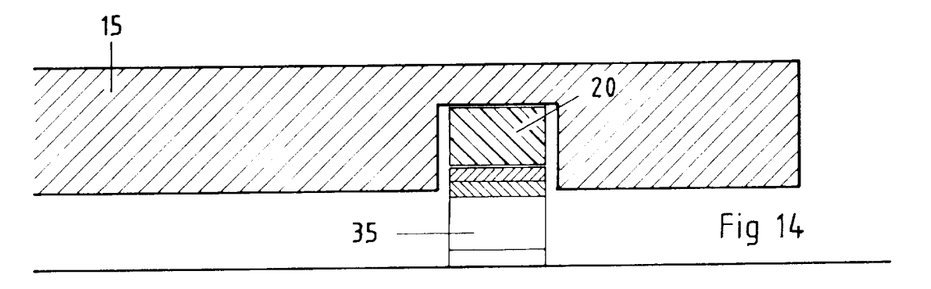

Further versions of the free standing platform are shown in FIGS. 13 to 16. In each of those versions the platform is broadly similar to that shown in FIGS. 10 and 11. In FIG. 13, the shelf 15 is made of 25 mm M.D.F. and the strip 20 of acoustic isolation material is 12 mm thick. The beam is a laminate of 3.2 mm aluminium 26 and 3.0 mm M.D.F 27. The foot 35 has a 3 mm top isolation pad 38 and a 2 mm bottom isolation pad 37. The version shown in FIG. 14 is similar, except that it lacks the upper isolation pad.

Figure 15:
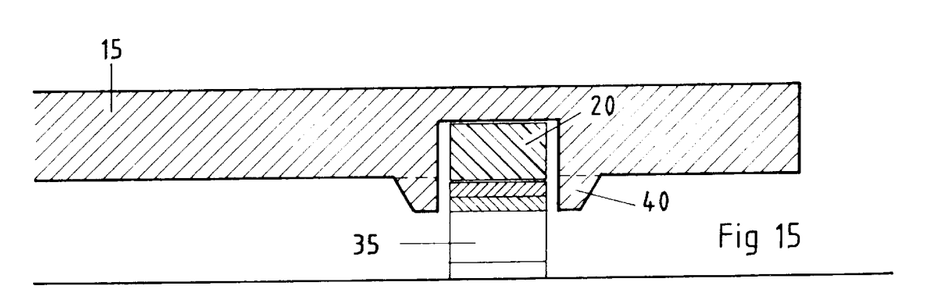
Figure 16:
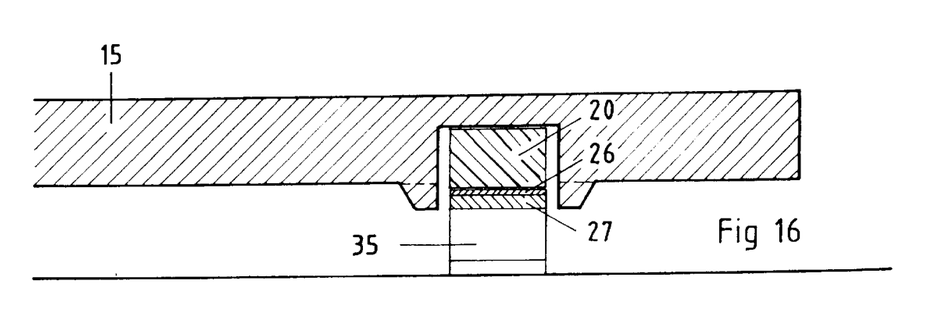

In FIG. 15, the shelf 15 is made of 18 mm M.D.F. and includes downward extensions 40 that serve to hide the beam 25. The strips 20 of acoustic isolation material, the beams 25 and the feet 35 are similar to those shown in FIG. 14. FIG. 16 is similar to FIG. 15, except that the beam comprises a 1.6 mm layer of aluminium 26 on top of a 3 mm layer of M.D.F 27.

Figure 17:
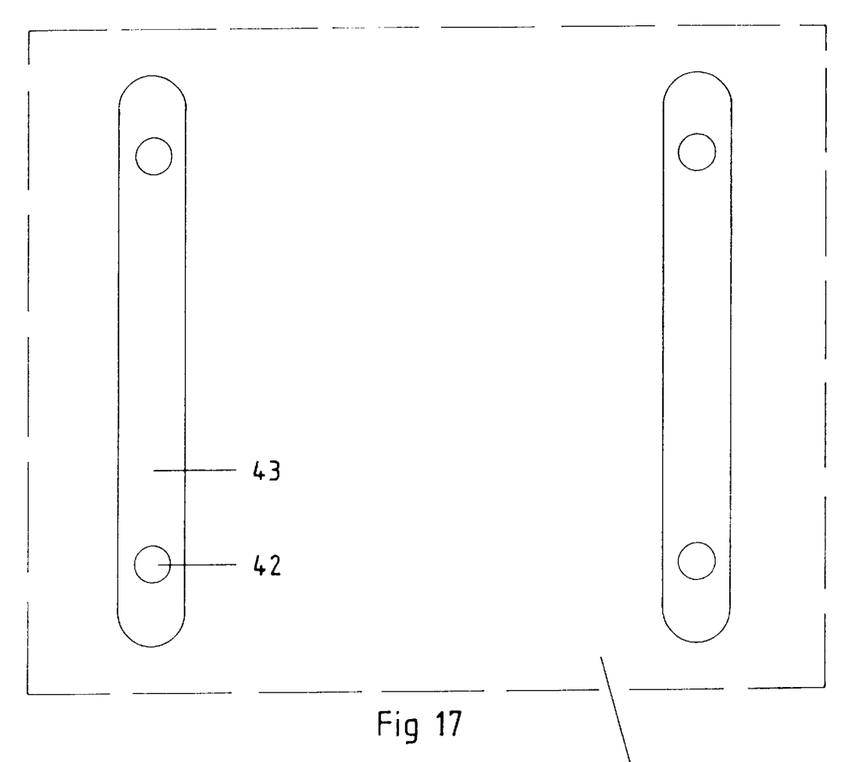
FIGS. 17 and 18 are plan and partial front views of an eleventh acoustic isolation platform.
Figure 18:
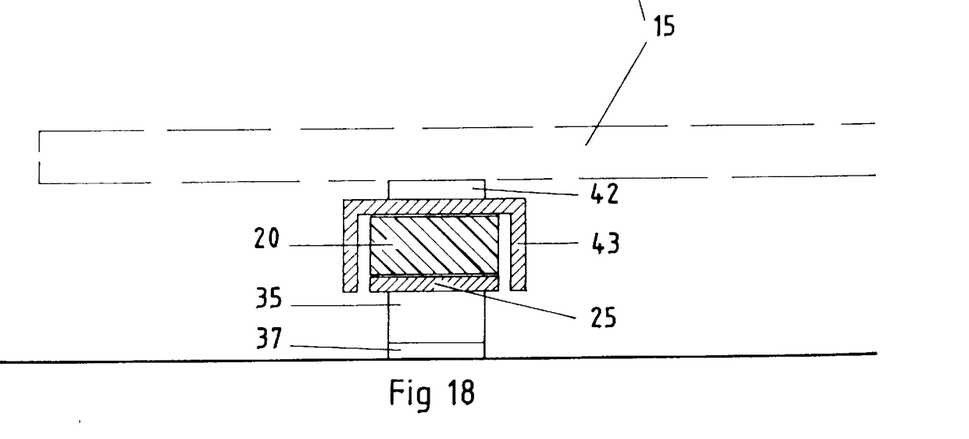

In the platform shown in FIGS. 17 and 18, the shelf 15 is connected by four cylindrical feet 42 to two rigid n-shaped beams 43. A strip 20 of acoustic isolation material is located within each rigid beam 43. The strip 20 is bonded to a flexible aluminium beam 25, which is supported by two feet 35 and their associated acoustic isolation pads 37.

Figure 19:
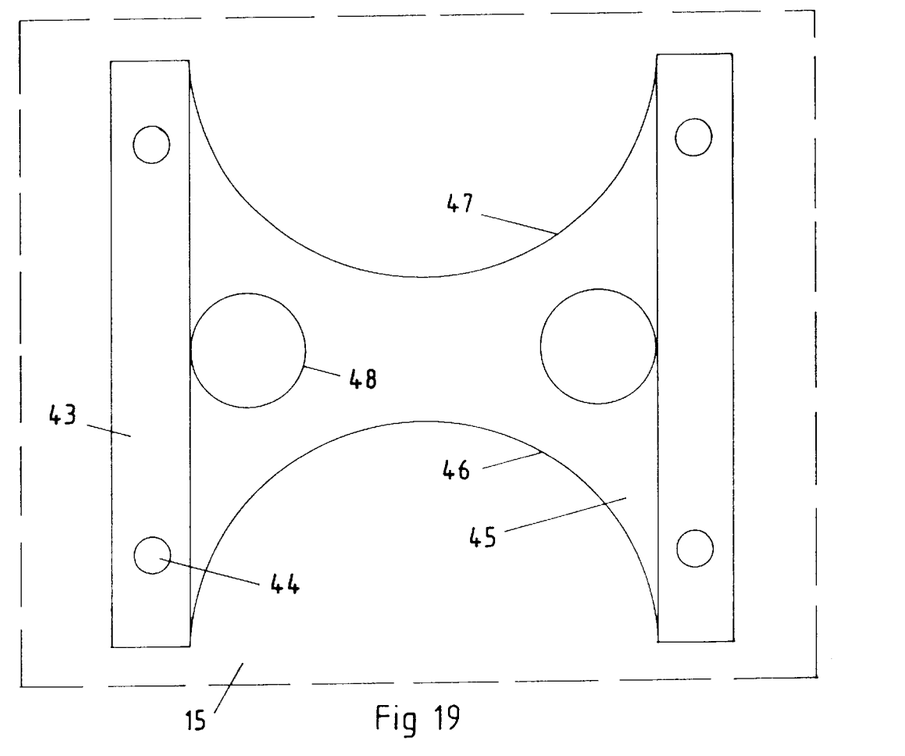
FIGS. 19 and 20 are plan and partial front views of a twelfth acoustic isolation platform.
Figure 20:
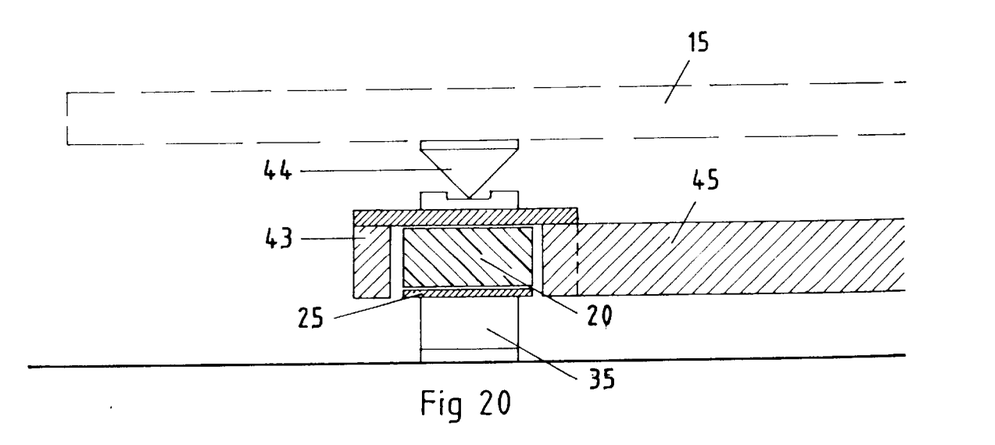

The platform shown in FIGS. 19 and 20 is similar in many respects to that shown in FIGS. 17 and 18. In this platform, the shelf 15 is supported on the rigid beams 43 by four spikes 44, and the rigid beams 43 are connected to one another by a sub-chassis consisting of a web 45. The web 45 is cut away at its front and rear edges 46, 47 and includes apertures 48 adjacent the rigid beams 43 to reduce its weight.

Figure 21:
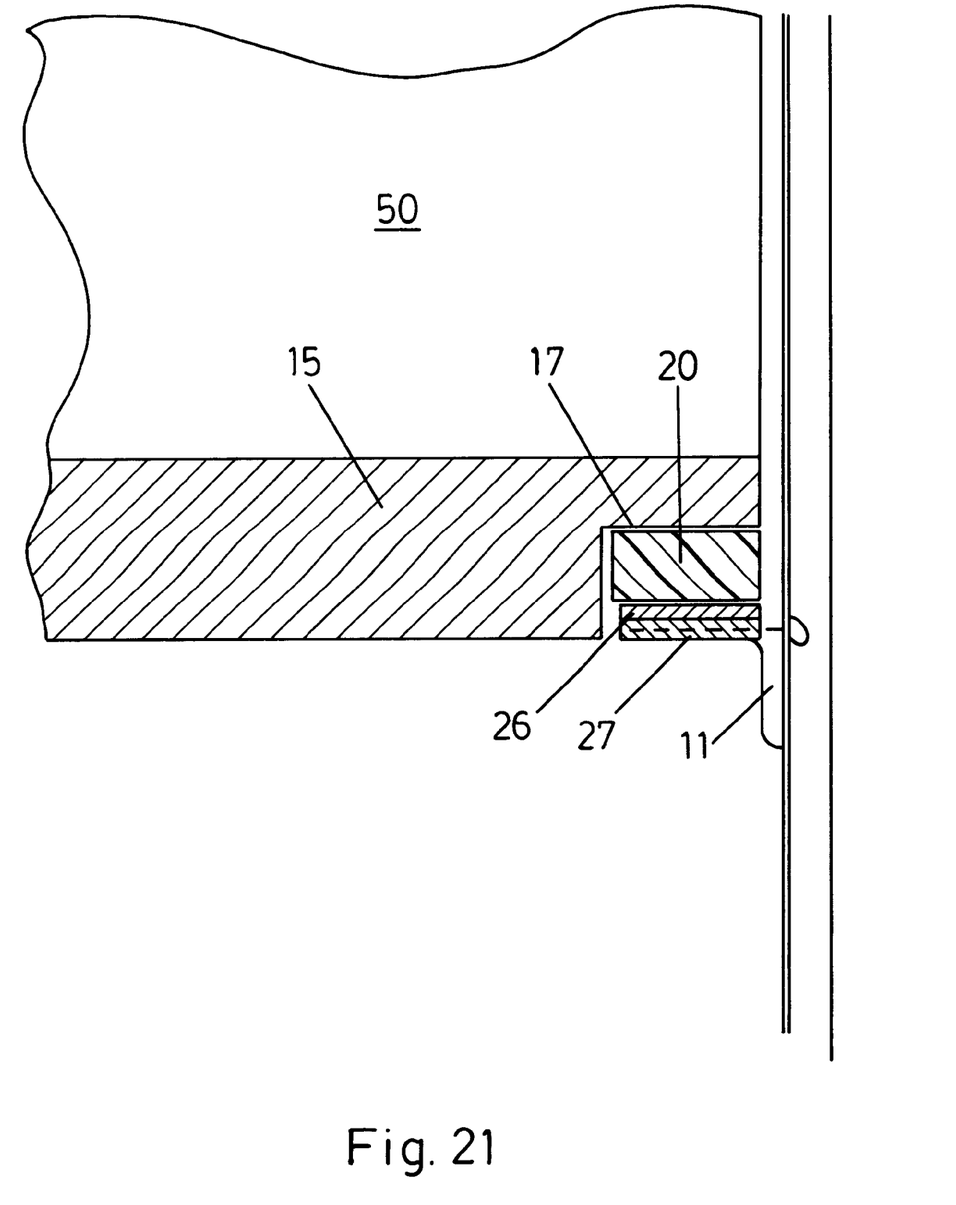
FIG. 21 is a partial cross sectional front view of an arrangement wherein the shelf of the acoustic isolation platform forms the chassis of the equipment.

In a further embodiment of the invention, the platform is incorporated into a piece of hi-fi 50 equipment, the shelf 15 forming the chassis of the equipment. Such a piece of equipment would not then need to be placed on a separate vibration isolation platform. The platform may similarly be built into other pieces of vibration-sensitive equipment, such as sensitive electronic balances.

Other modifications of the vibration isolation platform are possible. The shelf 15 may be made of other materials, for example float or laminated glass or a moulded material such as that sold under the trade mark CORIAN. The use of laminated glass has been found to give a particularly favourable result, producing a consistent response across the frequency range.

Alternatively, the shelf may be made of a combination of different materials: for example, it may be a laminated assembly comprising a layer of SORBOTHANE sandwiched between two layers of M.D.F.

The beams 25 may be made of M.D.F. or aluminium alone or may be laminated assemblies comprising those or other materials such as brass, stainless steel or glass fibre, and may include acoustic isolation materials such as SORBOTHANE. Additional strips or pads of acoustic isolation material may be provided between the beams 25 and the feet 35 or the shelf supports 11. The dimensions of the components, such as the thickness of the shelf 15 and the strips 20 of acoustic isolation material, may also be varied.

Furthermore, the strips 20 of acoustic isolation material may be profiled to reduce the contact area with the shelf and/or the beam. For example, the strips may include a number of V-shaped notches in their upper or lower surfaces.

I claim:

1. A vibration isolation platform for supporting hi-fi equipment or other vibration sensitive equipment comprising a shelf member having a surface adapted to support the hi-fi or other vibration sensitive equipment directly thereon the shelf member being supported by only two beam members having opposite ends, an acoustic isolation member located between the shelf member and each beam member, and two support members in spaced relation to one another engaging and supporting each beam member in spaced relation to the ends of the beam member to allow flexing of the beam member.

2. The platform of claim 1, in which the beam members are disposed adjacent to opposed edges of the shelf member.

3. The platform of claim 1, in which recesses are provided in the shelf member to accommodate the beam members and the acoustic isolation members.

4. The platform of claim 3, in which the recesses are formed in the edges of the shelf.

5. The platform of claim 3, in which the recesses are formed in the underside of the shelf.

6. The platform of claim 1, in which the beam members are of laminated construction.

7. The platform of claim 1, in which the beam members are made from materials selected from the group consisting of medium density fiber board, aluminum, brass, and stainless steel.

8. The platform of claim 1, in which the beam members include an acoustic isolation material.

9. The platform of claim 1, in which the shelf member is made from medium density fiber board, float glass or laminated glass.

10. The platform of claim 1, in which the shelf member has a mass of at least 2 kg.

11. The platform of claim 1, in which the acoustic isolation members are made from a material having a specific damping value of at least 50%.

12. The platform of claim 11, wherein the acoustic isolation members are made from a material having a specific damping value of about 55%.

13. The platform of claim 1, in which the acoustic isolation members have a thickness of at least 10 mm.

14. The platform of claim 13, wherein the acoustic isolation members have a thickness of about 12 mm.

15. The platform used in the combination of claim 1, in which acoustic isolation materials are provided between the beam members and the support members.

16. The platform used in the combination of claim 1, in which the support members comprise feet provided on the underside of the beam members.

17. The platform of claim 16, in which the feet include acoustic isolation materials.

18. The platform of claim 1, in which the beam members and the acoustic isolation members are housed in a sub-assembly on which the shelf member stands.

19. The platform according to claim 1 wherein the support members comprise shelf supports.

20. An article of vibration sensitive equipment according to claim 1, in which the shelf member of the vibration isolation platform forms a chassis of said equipment.

21. The platform of claim 1, wherein the shelf member rests on the acoustic isolation members, the acoustic isolation members being received in elongated relieved portions of the shelf member disposed proximate adjacent opposed edges of the shelf member.

22. An article of vibration sensitive equipment comprising a vibration isolation platform comprising a shelf member supported by only two beam members, an acoustic isolation member located between the shelf member and each beam member and only two support members engaging and supporting each beam member at locations spaced from ends of the beam member in such a manner as to allow flexing of the beam member.

23. The equipment of claim 22, in which the beam members are provided adjacent opposed edges of the shelf member.

24. The equipment of claim 23 wherein acoustic isolation materials are provided between the beam members and the support members.

25. The equipment of claim 22 in which the shelf member of the vibration isolation platform forms a chassis of said equipment.

26. An article of vibration sensitive equipment comprising a vibration isolation platform forming a chassis for the vibration sensitive equipment, the platform comprising a shelf member supported by two beam members, an acoustic isolation member located between the shelf member and each beam member and two support members engaging and suporting each beam member in such a manner as to allow flexing of the beam member.

* * * * *